Aug. 16, 1966     J. P. WALDROP     3,266,176
ORBITAL SIMULATOR

Filed Feb. 25, 1963     3 Sheets-Sheet 1

INVENTOR
JEFFERSON P. WALDROP

BY *Larson and Taylor*

ATTORNEYS

Aug. 16, 1966 J. P. WALDROP 3,266,176
ORBITAL SIMULATOR
Filed Feb. 25, 1963 3 Sheets-Sheet 2

INVENTOR
JEFFERSON P. WALDROP

BY *Larson and Taylor*

ATTORNEYS

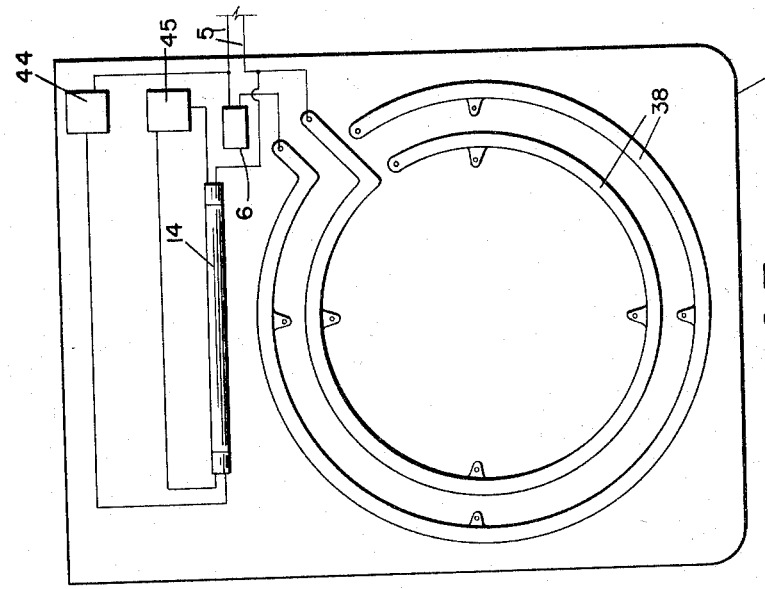
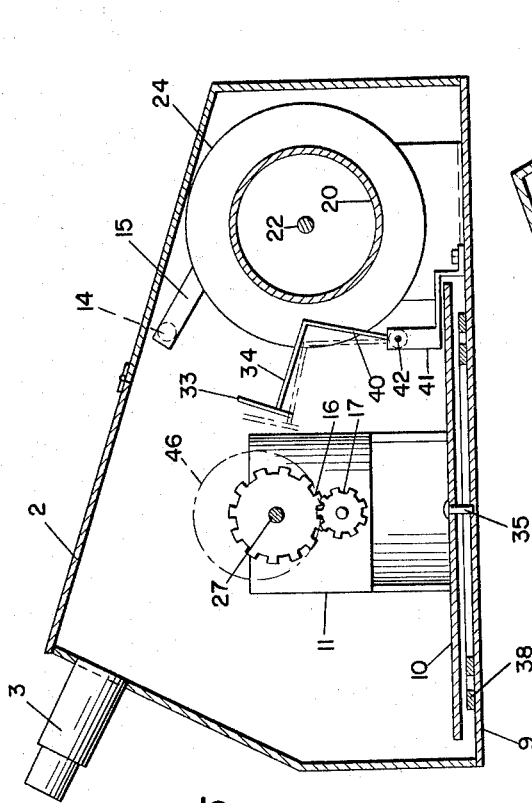
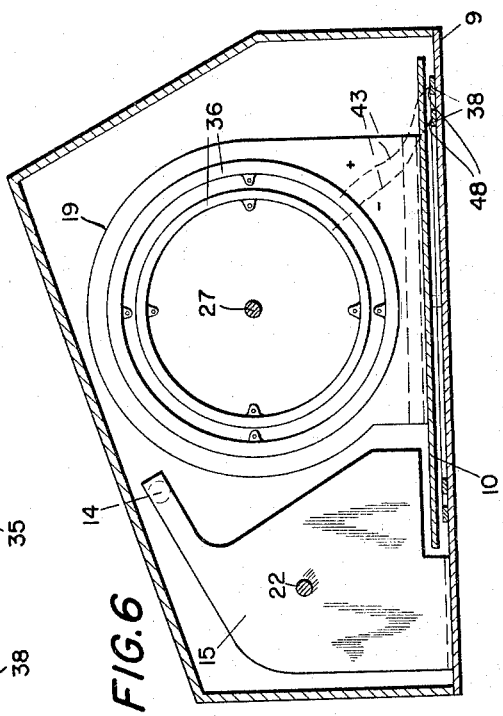
INVENTOR
JEFFERSON P. WALDROP

United States Patent Office 3,266,176
Patented August 16, 1966

3,266,176
ORBITAL SIMULATOR
Jefferson P. Waldrop, 4333 Grassmere Lane, Dallas, Tex.
Filed Feb. 25, 1963, Ser. No. 260,488
12 Claims. (Cl. 35—47)

This invention relates to a simulating device for creating the illusion that one is traveling in space or orbiting around a celestial body. Its unique design and the results created therefrom render it highly useful as a visual aid or educational device, and it is also susceptible of substantial utility as an amusement device. The subject of space travel has a natural fascination for people of all ages, and this simulator will enhance their interest while providing a better insight into the geography of the earth and other celestial bodies, as well as the relationships between various celestial bodies.

Accordingly, it is an object of this invention to provide a viewing simulator which will create the illusion that the viewer is traveling in space around a major celestial body.

It is a more specific object of this invention to provide such a simulator which, by uniquely utilizing the principles of relative motion, will create the illusion of traveling in space relative to a major celestial body and relative to the stars.

It is a further object of this invention to provide such a space illusion device which will create the illusion that the viewer is reversing his direction of travel in space.

It is a further object of this invention to provide a space illusion device which will permit the viewer to simulate any possible orbit around the earth or around some other celestial body.

It is still a further object of this invention to provide such a space illusion device capable of creating the illusion that the viewer is landing on the celestial body around which he has been orbiting.

It is a further object of this invention to provide such a space illusion device that will give the illusion of observing sunrise and sunset at successively different parts of the earth during successive orbits around the earth.

Finally, it is an over-all object of this invention to provide such a space illusion device which is unusually effective in performing all of the foregoing objects, which is relatively simple and inexpensive to manufacture, and which is capable of long and substantial use with a minimum of maintenance.

Other objects and advantages of the invention will be apparent during the course of the following description.

In the accompanying drawings, forming a part of this application, and in which like numerals are employed to designate like parts throughout, FIGURE 1 is a perspective view of the device in its assembled form.

FIGURE 5 is a side-sectional view taken along the lines 5—5 in FIGURE 3.

FIGURE 6 is a side-sectional view taken along the lines 6—6 in FIGURE 3, and showing elements of the electrical system.

FIGURE 7 is a plan view, partly schematic, of the stationary base member of the device, showing additional elements of the electrical system.

Figure 1:
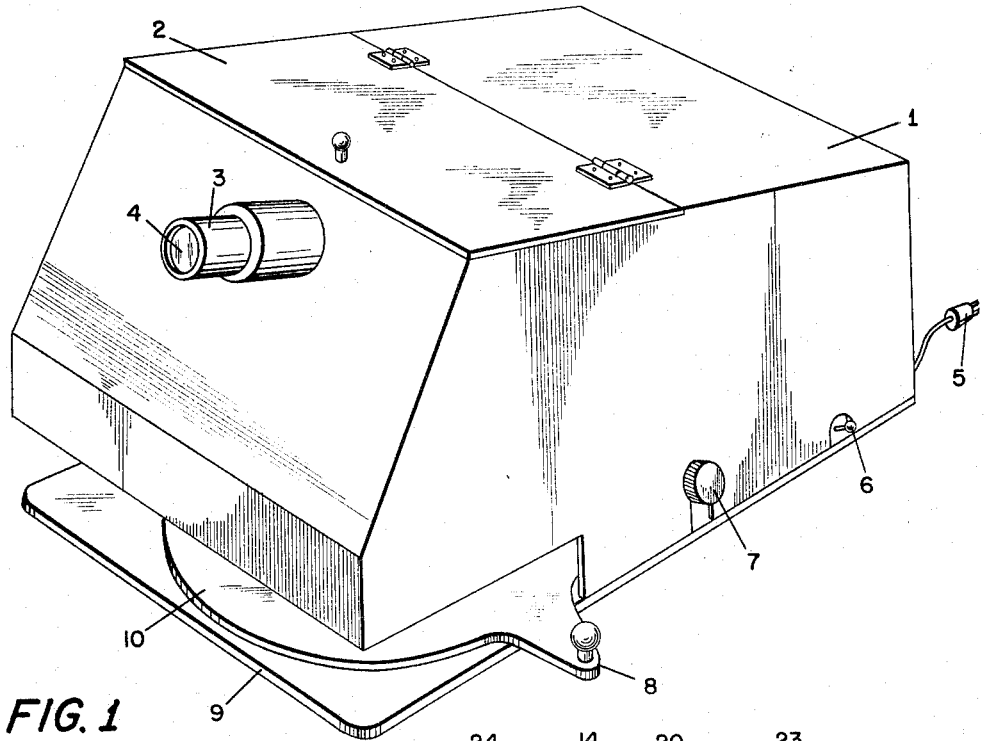

In the drawings, wherein for the purpose of illustration, is shown a preferred embodiment of my invention, numeral 1 designates the upper cover of the casing of the device. The base of the casing is designated by numeral 9, and the upper cover 1 of the casing can be removed from the base member 9 to permit access to the inner elements of the device. A hinged cover portion 2 is provided in the top of the casing to permit access to the inner elements for the purpose of making minor adjustments without the necessity of removing the entire cover member 1. An electric cord 5 with a suitable plug is provided to permit the device to be operated by current from a conventional household receptacle, and the device can be turned on or off by a switch 6. On a front wall of the casing there is provided a viewer 3 with a lens 4. The lens 4 can be either plain or magnifying, depending upon the selected sizes of the inner working elements. Alternatively, the viewer 3 and lens 4 may comprise a simple form of variable lens or telescope, whereby the illusion can be created that the viewer is moving toward or away from the particular celestial body about which an orbit is being simulated. Interchangeable lenses of varying magnification powers can be provided to simulate orbits at various altitudes. Also on the outside of casing 1 are provided adjusting handles 7 and 8 for purposes which will be explained fully hereafter.

Figure 2:
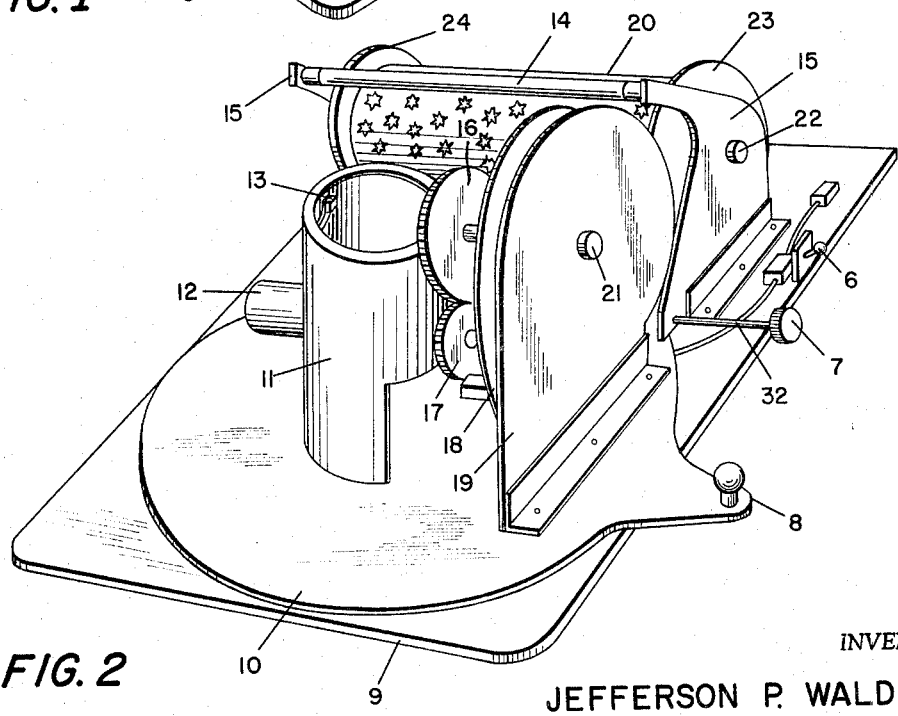
FIGURE 2 is a second perspective view of the device, but with the outer casing removed so as to display the inner elements in their relative positions.
Figure 3:
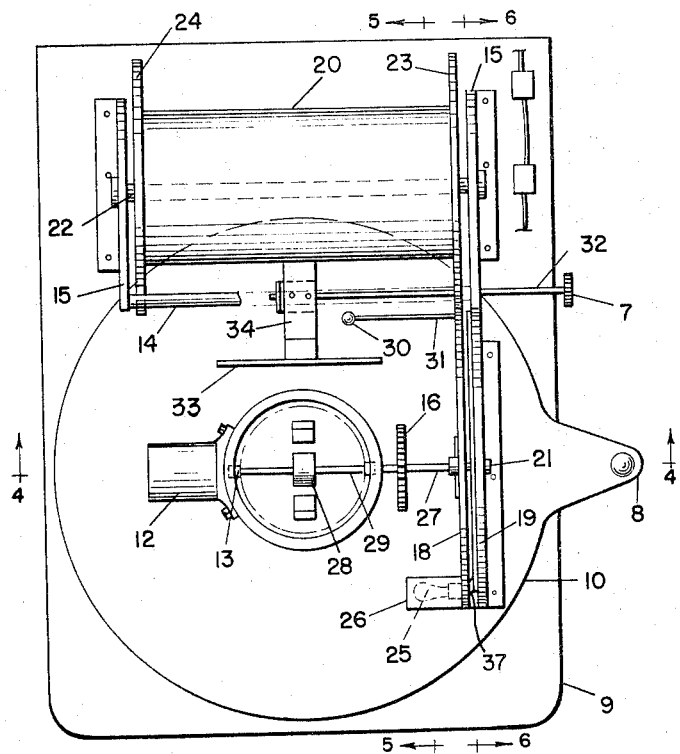
FIGURE 3 is a plan view, sectioned in parts, and with the globe removed so as to display the globe driving mechanism.
Figure 4:
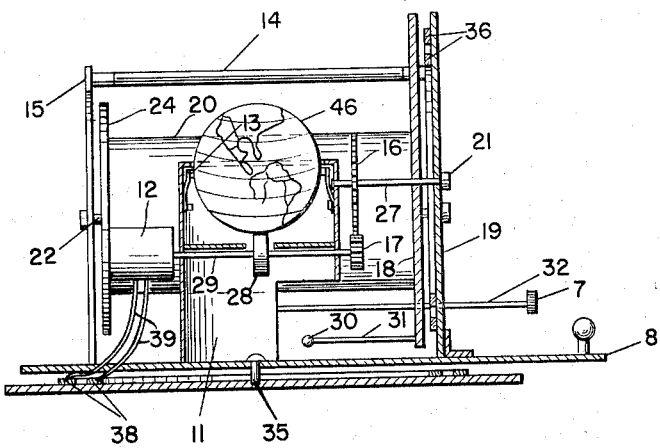
FIGURE 4 is a sectional elevation view, taken along the lines 4—4 in FIGURE 3.

FIGURE 2 shows most of the inner working elements of the device in their relative locations. A rotatable base member 10 is pivotally mounted on stationary base member 9 so as to be rotatable about a vertical axis 35, which is shown most clearly in FIGS. 4 and 5. The handle 8 is provided to rotate base member 10 and extends outside of the casing when the upper cover 1 of the casing is mounted on the stationary base member 9. Mounted on rotatable base member 10 is a globe support member 11. Globe support member 11 has a small electric motor 12 mounted thereon so as to drive the various movable elements of the device. As best seen in FIGS. 3 and 4, a drive shaft 29 extends from the motor 12 and includes a friction drive member 28 for rotating the globe about its axis. The globe itself is mounted by inserting it in the upper circular opening of support member 11 until it rests upon friction drive member 28. A series of small spring loaded members 13 are provided to maintain the globe centered in the opening in the globe support member. Preferably these small spring-loaded members should be so located as to grasp the globe at its major diameter. In one preferred arrangement the globe comprises a hollow steel ball 46, and the friction drive member 28 comprises a cylindrical member of magnetic material. The small spring-loaded members 13 can comprise magnets, roller balls, small Teflon pieces, or any like item, the important characteristic being that they will not unduly restrict the rotating movement of the globe 46 or score the surface of the globe. The globe 46 has on its surface representations of the geographical features of a major celestial body, such as the earth, the moon, or any of the planets. Several interchangeable globes can be provided so as to enable the user to simulate orbits around a number of different celestial bodies.

Shaft 29 from motor 12 extends through the globe support 11, and carries at its opposite end a small gear 17. A second shaft 27 is journaled at one of its ends in a vertical support member 19 mounted on the rotatable member 10. The other end of the shaft 27 is shown in the drawings as being journaled in a wall of globe support member 11, but it will be apparent that this end of shaft 27 can be journaled in any convenient manner. Mounted on shaft 27 for rotation therewith is a larger gear 16, and also mounted on shaft 27 is a large disc member 18. Gear 17 is driven by motor 12 through shaft 29; gear 17 in turn drives shaft 27 through gear 16; and disc 18 is caused to rotate by the rotation of shaft 27.

Extending from the face of the rotating disc adjacent to the globe 46 is a member 31 of small diameter having mounted thereon a small ball 30. The ball 30 has a fluorescent coating on its outer surface to simulate the moon, and the supporting member 31 is coated with a dull black paint so that it will not be easily seen when the device is in operation. The member 31 is mounted on the disc 18 so as to be easily removable, for instance by a screw thread connection.

Also mounted on the disc 18 is a small electric light to provide illumination in the interior of the casing and to simulate the sun moving in relation to the globe 46. A shield 26 is provided around the electric light 25 so as to direct the illumination provided by the light in the general direction of the globe 46.

Mounted on the stationary base member 9 so as to be clear of the rotating base member 10 are two spaced supports 15. A shaft 22 is journaled at its opposite ends in the supports 15, and carries thereon a drum member 20. At the opposite end of the drum member 20 are drive members 23 and 24, which are positioned so as to mate with the rotating disc 18 in a friction drive arrangement. As viewed in FIG. 3, drive member 23 is in friction drive engagement with rotating disc 18, and when the rotating base member 10 is rotated through an angle of substantially 180° by handle 8, the rotating disc 18 will drivingly engage drive member 24 so as to continue the rotation of the drum 20, but in an opposite sense.

Mounted on upper extensions of the support members 15 is a black light tube 14. The drum member 20 preferably has a number of randomly spaced small spots of fluorescent paint on a dull dark background. The black light causes the small spots on the drum 20 to glow so as to simulate stars when the device is in operation. The tube 14 is preferably of the type which creates ultraviolet energy in the wave length region from 3200 to 4000 angstrom units, commonly known as near ultraviolet or black light. It is well known that such ultraviolet energy can be used to excite fluorescent pigments in paints, dyes, or natural material to produce dramatic effects.

Mounted on the stationary base member 9 so as to be clear of the rotating base member 10 is a support member 41 upon which is mounted a simulated rainbow 33. Supporting arm 40 is rigidly connected to rod 32 which is journaled in support member 41 as shown at 42. An extension 34 of arm 40 supports the rainbow 33. By manipulating handle 7 on rod 32 the rainbow can be moved into position so as to be visible above the globe 46 from the viewer 3, or the rainbow can be moved downwardly to the position shown in dotted lines in FIG. 5 so as not to be visible from the viewer 3, depending upon the particular effect which it is desired to create. Rainbow 33 itself preferably comprises a translucent plastic member with translucent colors painted thereon in the general arrangement and configuration of a rainbow.

The electrical wiring arrangements for the device are shown most clearly in FIGS. 6 and 7. Referring to those figures, the wires from the source of electricity are shown at 5, with the controlling switch being designated 6. Mounted on stationary base member 9 are two concentric circles 38 made from a conducting material. If the base member 9 is made of plastic or some other insulating material, the conducting elements 38 may be mounted directly on the base. However, if the stationary base member 9 is made from a conducting metal, then it will be necessary to interpose a layer of insulating material between the stationary base member 9 and the electrical conducting members 38. Mounted on the undersurface of rotating base member 10 at the same radius as the conductive circles 38 are two small spring-loaded electrical connectors 48 of any of several well-known types. Because of their location at the same radius as the conducting circles 38, these small electrical connectors constantly transmit electricity from the conducting circles 38 to the motor 12 through wires 39.

As shown in FIGS. 3 and 6, support member 19 has on its face adjacent to the rotating disc 18 two concentric circles of electrical conducting material constructed substantially in the same manner as previously described for the conducting circles 38. A pair of wires 43 are connected to the circles 36 and either to spring-loaded connectors 46 or to the wires 39 so as to complete the electrical circuit to the concentric circles 36. Mounted on the disc 18 in the vicinity of the electric light 25 and on the face of the disc adjacent to the support members 19 are two small spring-loaded electrical connectors 37 for maintaining the circuit from the circles 36 to the light 25 while the disc 18 is rotating relative to the support member 19. Preferably connectors 37 are of the same type as the corresponding connectors used on the bottom of the rotatable base member 10.

Schemmatically shown in FIG. 7 are the various electrical connections and associated elements for the black light tube 14. Numeral 44 denotes the ballast for the black light tube, and numeral 45 denotes the tube starter.

In operation, with wires 5 connected to a convenient electric receptacle, when switch 6 is turned to the "on" position, motor 12 rotates shaft 29 which drives globe 46 through the magnetic drive member 28. Gear 17 drives gear 16, which in turn rotates disc 18 with the electric light mounted thereon. If an earth globe is being used at 46, the small fluorescent ball 30 can be used to simulate the moon, or if a moon globe is used at 46 the small fluorescent ball can be used to simulate the earth. Drum 20 is rotated by the friction drive engagement between drive member 23 and disc 18 when the rotatable base member is in the position shown in FIG. 3. With the device operating in this manner the view through the viewer 3 gives the illustration that one is orbiting in space around the globe 46, and this illusion is enhanced by the relative movement of the "stars" on rotating drum 20. Since drum 20 is rotating in an opposite sense from globe 46, the rotating stars seem to be moving past the person in orbit. For instance, as viewed in FIG. 5, if the globe 46 is moving in a counter-clockwise direction, the illusion will be created that the viewer is moving around the earth in a forward direction, and the impression is created that the stars are moving past him. The rotating electric light 25 intermittently illuminates the surface of the globe which is visible to the viewer, and creates the impression that one is observing sunrise and sunset. The small "moon" ball 30 seems to be floating in space and moving around the globe 46. The "rainbow" 33 can be moved into or out of sight as desired by the user. By rotating rotatable base member 10 by handle 18, the user can create the illusion of stopping in space and then reversing the direction of his space craft. Thus when the rotatable base member 10 is rotated through substantially 180° so as to have the rotating disc 18 drive the drum drive member 24, the globe 46 will then be rotating in a clockwise direction while the drum 20 will be rotating in a counterclockwise direction. It then appears from the viewer 3 that one is moving backwardly around the globe 46 and that he is moving backwardly past the "stars" on drum 20. By using lenses of varying magnifying powers, orbits can be simulated at various distances from the globe 46. Also, by using a variable lens arrangement, of a simple telescope type, the user can simulate a landing on the globe 46.

In one specific embodiment of the invention which has been constructed, a small motor was used which rotated at one revolution per minute. A four-inch diameter globe was driven by a 1⅛" diameter magnet, with the globe making one revolution every three and one half minutes. A one-inch gear was used at 17 with a three-inch gear being used at 16, whereby the "sun" traveled faster than the "earth," making each "sunrise" appear further in the west. A seven watt bulb was used to simulate the sun.

From the foregoing description of the structure and operation of the invention, it will be apparent that the invention is susceptible of various modifications. For instance, an intermittent light source timed to the rotation of the globe could be used instead of the rotating electric light 25. The geographical representations on the globe 46 could be painted with a fluorescent pigment, and the only light source provided could be a source of black light to excite the fluorescent pigments on the globe and the drum 20. Various drive arrangements could be used to rotate the globe 46, and the globe could be fixed to the support 11 so as to rotate on a constant axis. It will be understood that in the embodiments shown in the drawings an orbit around any major diameter of the globe is possible. Merely by raising the hinged cover 2 and repositioning the globe 46 in the globe support 11, one can simulate a different orbit around the globe. Furthermore, a continuous scroll arrangement could be substituted for the rotating drum 20. The drum 20 could be constructed with a source of light on the inside, with the "stars" being created by small perforations in the skin of the drum. Although it is believed that the illustrated drive arrangement leading from the electric motor to the "star" drum is uniquely simple and inexpensive, obviously other drive arrangements could be used, or separate drives could be used for each element. Accordingly, it is to be understood that the form of my invention, herewith shown and described, is to be taken as a preferred example of the same, and that various changes in the shape, size and arrangement of parts may be resorted to, without departing from the spirit of my invention. Therefore, I do not desire to be limited to the embodiment herein shown and described, but only by the subjoined claims.

I claim:

1. A space illusion device comprising: a casing having a viewing opening therein; a movable surface in said casing and having thereon representations of the surface features of a heavenly body, at least a portion of said movable surface being in the line of sight of said viewing opening; a second movable surface in said casing and having small fluorescent spots on a dark background to represent stars, said second movable surface being located behind said first movable surface relative to said viewing opening and having at least a portion thereof located in a line of sight extending from said viewing opening immediately above said first movable surface to said second movable surface; a source of light in said casing for illuminating said first movable surface so that it will be visible from said viewing opening; a source of black light in said casing for causing said fluorescent spots to glow; and means for moving said movable surfaces in opposite senses relative to each other, whereby the view from the viewing opening gives the illusion that the viewer is moving in space relative to a heavenly body and to the stars.

2. A space illusion device as recited in claim 1 wherein said first movable surface comprises a translationally stationary rotatably mounted sphere, and said source of light comprises an electric light mounted for rotation in the same sense as said sphere but at a radius spaced from the surface of said sphere.

3. A space illusion device as recited in claim 2 wherein said second movable surface comprises a rotatably mounted drum.

4. An orbital simulator comprising: a casing having a spherical body therein; means supporting said sphere translationally stationary for rotation about an axis of said sphere; said sphere having on its surface representations of the features of a heavenly body; a source of light in said casing, and means for moving said source of light around said sphere; means having small fluorescent spots thereon against a dark background and being located in said casing behind said sphere so as to be visible immediately above the surface of said sphere; means for moving said sphere and for moving said last-mentioned means in an opposite sense from the movement of said sphere; and a viewing opening in a wall of said casing in front of said sphere, whereby the view from the viewing opening gives the illusion that the viewer is traveling in space around a heavenly body.

5. A space illusion device comprising: a casing having a viewing opening therein; a rotatably mounted sphere in said casing and having thereon representations of the features of a heavenly body; means supporting said sphere translationally stationary for rotation about one of its axes and so as to be visible from said viewing opening; a movable surface located behind said sphere relative to said viewing opening and comprising a dark background having a number of randomly spaced points thereon to simulate stars; means for illuminating said points; means for intermittently illuminating the portion of said sphere which is visible through said viewing opening so as to simulate sunrise and sunset; means for rotating said sphere about one of its axes; and means for effecting movement of said movable surface in an opposite sense relative to the rotation of said sphere, whereby the view through said viewing opening gives the illusion of moving in space around a heavenly body.

6. A space illusion device as recited in claim 5 wherein said movable surface comprises a rotatably mounted drum; means supporting said drum for rotation about an axis parallel to the axis of rotation of said sphere; said points on said drum comprising small spots of fluorescent paint, and said means for illuminating said points comprising a source of black light in said casing.

7. A space illusion device as recited in claim 5 wherein said means for illuminating said sphere comprises an electric light mounted for rotation in the same sense as said sphere but at a radius spaced from the surface of said sphere.

8. A space illusion device as recited in claim 7 wherein said electric light is mounted for rotation at a rate different from the rotation of said sphere.

9. A space illusion device as recited in claim 5 further comprising means permitting the axis of rotation of said sphere to be rotated traversely through an angle of 180° so as to reverse the direction of rotation of said sphere and the sense of movement of said movable surface as viewed through said viewing opening, whereby the illusion is created of reversing the direction of movement in space around a heavenly body.

10. A space illusion device as recited in claim 5 further including a translucent plastic member having a series of translucent colors thereon in the general shape of a rainbow; and means for moving said plastic member into the line of sight from said viewing opening between said sphere and said movable surface.

11. A space illusion device comprising: a casing; a viewing opening in a wall of said casing; a base member in said casing mounted for rotation about a vertical pivot; a globe support member mounted on said rotatable base member; means in and adjacent to said globe support member for supporting and rotating a globe in the line of sight from said viewing opening; a disc-shaped member of a larger diameter than the diameter of said globe and disposed transversely to the axis of rotation of said globe and parallel to the line of sight from said viewing opening; means on said base member supporting said disc for rotation about an axis parallel to the axis of rotation of said globe; a source of light mounted on said disc near the perimeter thereof and on the side adjacent to said globe; a drum-shaped member mounted in said casing for rotation about an axis transverse to the line of sight from said viewing opening but visible from said viewing opening, said drum-shaped member abutting said disc-shaped member so as to rotate therewith; said drum-shaped member having a number of randomly spaced points thereon against a dark background; means for illuminating said points so as to simulate stars; said globe having on its surface representations of the geographical features of a heavenly body; means for driving said globe and said disc-shaped member in the same direction, whereby said drum-shaped member will be driven by said disc in an opposite sense; and a handle on said base member for rotating said base member, including said globe and said disc, about said vertical pivot, thus effectively reversing the direction of rotation of said globe and said drum member as viewed through said viewing opening; whereby the view through said viewing opening gives the illusion of traveling through space around a heavenly body.

12. A space illusion device comprising: a casing having a viewing opening in a wall thereof; a translationally stationary globe rotatably mounted in said casing and visible through said viewing opening; said globe having on its surface simulations of the geographical features of a heavenly body; a movable surface having a number of small points thereon against a dark background; said movable surface being located behind said globe relative to said viewing opening so as to be visible from said viewing opening immediately above the surface of said globe; means for illuminating the surface of said globe and the points on said movable surface; and means for rotating said globe in one sense and for moving said movable surface in an opposite sense as viewed from said viewing opening, whereby the view from said viewing opening gives the illusion of traveling in space around a celestial body.

References Cited by the Examiner
UNITED STATES PATENTS

| | | | |
|---|---|---|---|
| 202,590 | 4/1878 | Schedler | 35—45 |
| 1,099,315 | 6/1914 | Scholes | 35—47 |
| 1,230,878 | 6/1917 | Dumars. | |
| 1,833,540 | 11/1931 | Scott et al. | 104—83 |
| 2,140,326 | 12/1938 | Morse | 35—46 |
| 2,615,266 | 10/1952 | Wallin | 40—77 X |
| 3,089,259 | 5/1963 | Miller | 35—45 |

EUGENE R. CAPOZIO, *Primary Examiner.*

JEROME SCHNALL, *Examiner.*

HARLAND SKOGQUIST, *Assistant Examiner.*